(No Model.)
E. W. RICE, Jr.
SYSTEM OF ELECTRICAL DISTRIBUTION.
No. 516,836. Patented Mar. 20, 1894.
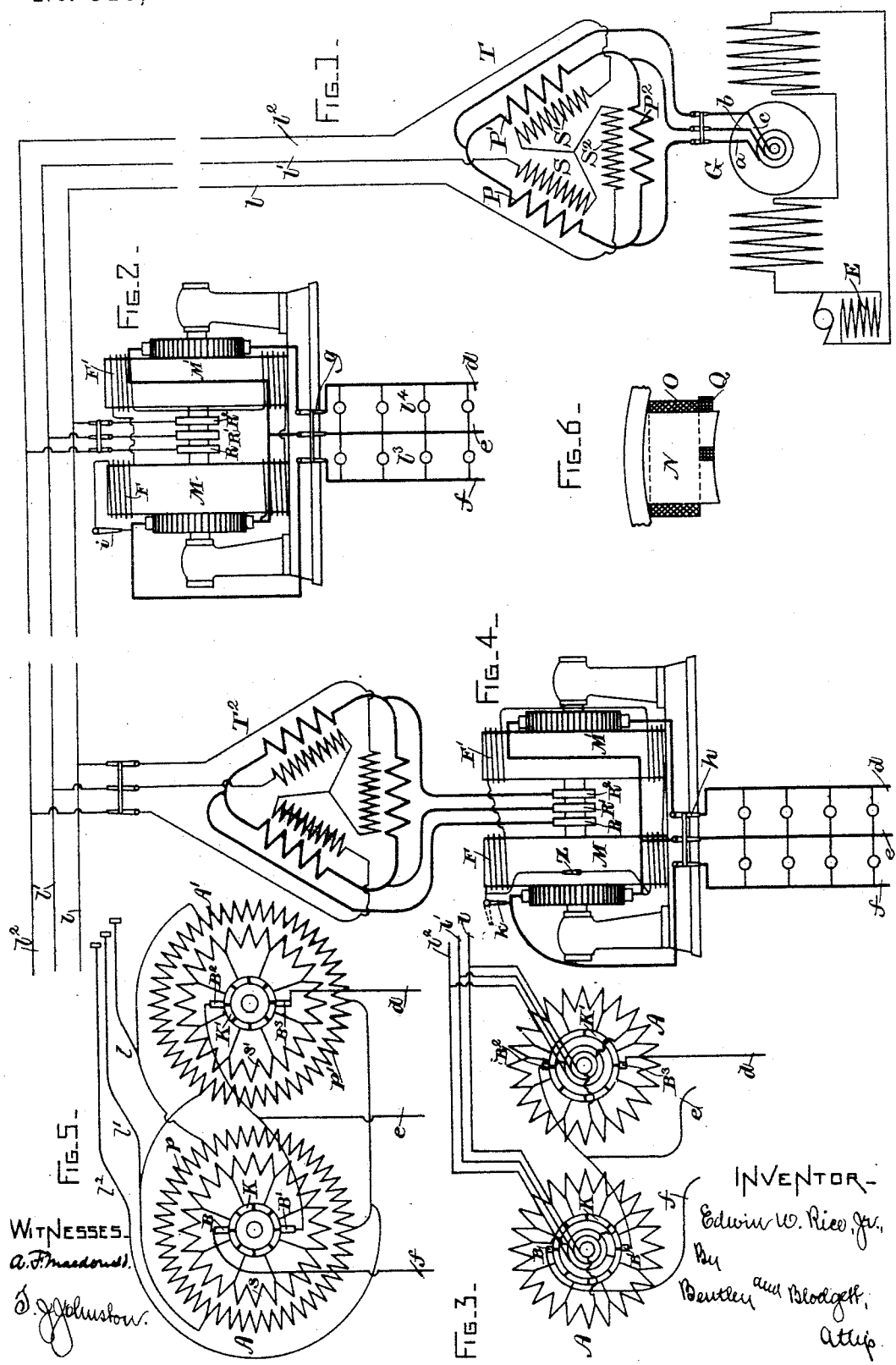
WITNESSES.
A. F. Macdonald.
T. J. Johnston.
INVENTOR-
Edwin W. Rice, Jr.
By Bentley and Blodgett,
Attys.

UNITED STATES PATENT OFFICE.

EDWIN W. RICE, JR., OF SWAMPSCOTT, ASSIGNOR TO THE GENERAL ELECTRIC COMPANY, OF BOSTON, MASSACHUSETTS.

SYSTEM OF ELECTRICAL DISTRIBUTION.

SPECIFICATION forming part of Letters Patent No. 516,836, dated March 20, 1894.

Application filed May 5, 1893. Serial No. 473,097. (No model.)

*To all whom it may concern:*

Be it known that I, EDWIN W. RICE, Jr., a citizen of the United States, residing at Swampscott, in the county of Essex and State of Massachusetts, have invented certain new and useful Improvements in Systems of Electrical Distribution, of which the following is a specification.

My invention relates to systems of electric distribution employing alternating currents and has for its object to transmit such currents at high potential to a distance, transform them into currents of lower potential, and then utilize them for the direct production of light, power, &c., and concerns particularly the transmission of alternating currents of the poly-phase character, two-phase, three-phase or more, but is not limited to the use of such currents, inasmuch as single-phase alternating currents may be employed if the apparatus is suitably modified, as hereinafter described.

To this end my invention consists in certain novel organizations of circuits and apparatus affording a system of electrical distribution combining the advantage of the alternating and a direct series-multiple system, and will be understood by reference to the accompanying drawings, which are diagrammatic representations of the circuit connections and apparatus, and show the invention as used in connections with a three-phase system, as this is its preferred form; but such modifications as are necessary to adapt it for single-phase currents, two phase-currents or poly-phase currents other than the three-phase currents described, will be readily understood by those familiar with the art.

In the drawings Figures 1, 2 and 4 are diagrams of the apparatus hereinafter explained. Figs. 3 and 5 are diagrams of armatures employed, and Fig. 6 is a modification.

In Fig. 1, G represents a source of three-phase currents, which may be one or a number of electric generators having the well-known connections to three brushes or current leading devices $a, b, c$, and driven by any suitable power. The exciting currents for the field-magnets of the generator G may be furnished by a small auxiliary machine E, or a portion of the current generated by its own armature may be commuted, if desired, to furnish this exciting current. The generated current may be of any potential. In case the distance is great to the points of consumption the potential will necessarily be high to save installation cost and loss of power. In such cases a step up transformer T may be used to raise the potential of the initial current, its primary winding P, P', P², of relatively coarse wire, connecting with the brushes $a, b, c$, and its secondary winding, of relatively fine wire S, S', S², connecting with the lines $l, l', l^2$, leading to the work. By my invention, this alternating current of high potential is passed through a specially arranged apparatus by which it is transformed into current of lower potential, and this transformed current is fed to the translating devices, such as a number of electric lamps, motors, or other work. This apparatus is illustrated in Figs. 2, 3, 4 and 5. It consists of two similar motors, or motor-generators, mounted on the same shaft or otherwise connected so as to revolve together, whose function is to change the alternating currents into direct or commuted currents, the transformed currents from these machines co-operating to feed, through mains $d, e, f$, any translating devices connected in series-multiple in what is known as the three-wire system, or other series-multiple systems. The transformation of the current from high to low potential may be accomplished in the motors themselves, in which case they become transformer motor-generators, as illustrated in Fig. 2, or such transformation may be accomplished in subsidiary transformers adapted to the high potential circuit and the transformed low potential currents then pass to the motors by which they are suitably commuted before passing to the work circuit, as shown in Fig. 4.

In Fig. 2, M, M' represent transformer motor-generators mounted on the same shaft and base and revolving together. The current from the lines $l, l', l^2$, passes to the collecting rings R, R′, R², and thence through the armatures of M and M′ in series or multiple, as desired. It is usually best passed through the windings of these machines connected in series where no preliminary transformation of potential has been effected, so as to permit the use of as large a wire as possible in the high-tension winding. The armatures of the machines M and M′ are shown diagrammatically at A and A′, Fig. 5. $p$, $p'$ are the high potential or primary windings connected directly with the mains $l$, $l'$, $l^2$, and wound parallel thereto are the low potential coils $s$, $s'$. Connections are taken from the coils $s$, $s'$ to the commutators K, K′, one for each machine, upon which bear brushes B, B′, B², B³, respectively, which are connected to the local or work circuit, $d$, $e$, $f$, as shown, the brushes B′ and B² being connected through $g$ to the middle conductor $e$ of a three wire system, and the brushes B, B³, with the conductors $d$, $f$. The consumption devices such as lights $l^3$, $l^4$, Fig. 2, are connected across this circuit in the usual manner and the system becomes self-regulating for variation of the load on the two sides of the three wire system.

In Fig. 4 the change of potential of the alternating current, that is, from high to low potential, is accomplished in a separate transformer T², whose primary windings are in the line circuit, and whose secondary windings connect with the three collecting-rings of the motor commutators M, M′ as before. In this case, as shown diagrammatically in Fig. 3, there is needed but a single winding on the armature A, A′, which winding has a double set of connections, one set being of the usual type common to three-phase machines, that is, connections taken out at one hundred and twenty degrees apart, leading to the collecting rings R, R′, R², and the other set leading to commutators K, K′, upon which bear brushes B, B′, B², B³, as shown in Fig. 5. The connections to the work-circuit of the armatures of the motors M, M′ correspond in this case to those of Fig. 5, and the difference between the machines consists in the fact that the transformation from high to low potential takes place in one case in the machine itself and in the other case in the auxiliary transformer T². As the machines M and M′ merely change the character of the current from the lines $l$, $l'$, $l^2$, that is, cause it to flow in one direction, but little energy is required to effect their rotation and the transformation is highly efficient.

The generator G, Fig. 1, may typify a large electric power source or station, such for instance as a number of generators driven by water or other power.

The machines M and M′, of Figs. 2 and 4, may represent a distributing station far away, it may be, from the source G, and the system may be operated as follows: Suppose the switches connecting the source G and M, M′ to be closed, the local work-circuit switches $g$, $h$, and field-magnet circuit switches $i$, $k$ to be open; current flowing over the lines $l$, $l'$, $l^2$ through the armatures A, A′ will start them into rotation and they will gradually increase in speed until they reach a speed nearly synchronous with that of the machine G. The circuit through the field-magnets being now completed by the closing of the switches $i$, $k$, these magnets become energized and the armatures step into synchronism with the machine G, and the switches for the local work circuits $g$ and $h$ may be closed at any time thereafter. To increase the starting effect of the machines M and M′ a closed-circuit winding F F′ (Figs. 2 and 4) may be placed upon the field-magnets, operating in accordance with well known principles, and becoming the seat of induced currents under the influence of the revolving magnetic field set up in the movable element (which may be the armature) by the three-phase currents, until synchronizing speed is reached, thus enhancing the rotative effect on the armature. The shunt winding of the field magnets of M and M′ may, indeed, be closed upon itself at the start and act as a closed-circuited winding and be afterward connected to the brushes on the commutator as described. This arrangement is illustrated particularly in Fig. 4 where the switch controlling the closed circuit winding is shown at Z, on the field-magnet; it being necessary that the field magnet switch $k$ connecting the winding F F′ to the commutator brush should be thrown open as illustrated by the dotted lines. If desired the two switches may be so connected that the opening of one will close the other, but ordinarily the illustrated arrangement is preferred.

The structure above described will operate with any poly-phase currents. An equivalent arrangement for use with single-phase alternating currents may be adopted when desired; and in such an arrangement I prefer to employ a closed circuit conductor to surround only a portion of the pole face of the field-magnets of the motor-generator so as to make what is known in the art as a "shaded pole," such as is set out in the patent to Elihu Thomson, No 428,650, dated May 27, 1890. In such an arrangement the armatures will start into rotation and approach to nearly synchronous speed with a generator G, which furnishes in this instance single-phase alternating currents; the switches $i$, $k$, being then closed, the field-magnets "pick up" or "build up" their magnetism (using terms in common use to express their acquirement of magnetic condition), and the armatures A A′ will then step into synchronism with the generator as before. Such an arrangement is shown in Fig. 6 wherein N is a single pole piece of an alternating current machine and O is its field magnet coil, the parts being all shown in section, while Q is a smaller closed circuited winding used to "shade" the pole. The application of the device is sufficiently apparent from the preceding description.

What I claim as new, and wish to protect by Letters Patent of the United States, is—

1. In a system of distribution of electric energy, a source of alternating or polyphase currents, lines leading therefrom to a point of distribution, and means adapted to commute the currents and deliver them to mains feeding translating devices by the three-wire or series multiple system.

2. In a system of distribution of electric energy, a source of alternating or poly-phase currents, a step-up transformer, lines leading therefrom to a point of distribution, and means adapted to transform and commute the currents and deliver them to mains feeding translating devices by the "three-wire" or series-multiple system.

3. In a system of distribution of electricity, a source of alternating or poly-phase currents, a step-up transformer, lines leading therefrom to a point of distribution, and motor-generators revolving in unison connected to such lines and driven by the current therefrom; such motor-generators being adapted to transform and commute the currents and deliver them to mains feeding translating devices.

4. In a system of distribution of electric energy, a source of alternating or poly-phase currents, a step-up transformer, lines leading therefrom to a point of distribution and motor-generators revolving in unison connected to such lines and driven by the currents therefrom; such motor-generators being adapted to transform and commute the currents and deliver them to mains feeding translating devices by the "three-wire" or series-multiple system.

5. In a system of distribution of electric energy, a generator of three-phase currents, a step-up transformer, lines leading therefrom to a distributing station, two motor-generator armatures mounted upon the same shaft and energized by the same or different field coils and rotated by the three-phase currents; the armatures being adapted to transform and commute the three-phase currents and deliver them to mains supplying translating devices.

6. In a system of distribution of electric energy, a generator of three-phase currents, a step-up transformer, lines leading therefrom to a distributing station, two motor-generator armatures mounted upon the same shaft and energized by the same or different field coils and rotated by the three-phase currents; the armatures being adapted to transform and commute the three-phase currents and deliver them to mains supplying translating devices by the direct series-multiple or three-wire system.

7. In a system of distribution of electric energy, a source of alternating poly-phase currents, a step-up transformer, lines leading therefrom to a point of distribution and motor-generators revolving in unison connected to such lines and driven by the current therefrom, such motor generators being provided with a winding upon their field magnets adapted to be closed circuited by a switch and to be connected when open circuited to commutator brushes; whereby the starting effect of the motor generator is increased.

8. In a system of distribution of electric energy, a generator of alternating currents, a step-up transformer, lines leading therefrom to a point of distribution and a transformer motor generator provided with a closed circuited winding surrounding a portion only of the field magnet pole; whereby a shaded pole is formed and the starting effect of the transformer motor generator is increased, substantially as described.

9. In a system of distribution of electric energy, a generator of three-phase currents, lines leading therefrom and motor generators revolving in unison supplied from such lines and having armatures driven by the three-phase currents and provided with connections to a commutator which delivers current to mains supplying translating devices.

10. In a system of distribution of electric energy a generator of three-phase currents, lines leading therefrom furnishing current to motor generators revolving in unison whose armatures are driven by the three-phase currents and provided with connections to a commutator which delivers current to mains supplying translating devices by the three-wire or series multiple system.

11. In a system of distribution of electric energy, a source of alternating or polyphase currents, lines leading therefrom to a distributing station and supplying current to two motor generators whose armatures are mounted upon the same shaft and are rotated by the alternating or polyphase current; the armatures having windings connected to a commutator adapted to feed mains supplying translating devices.

12. In a system of distribution of electric energy, a source of alternating or polyphase currents, lines leading therefrom to a distributing station and supplying current to two motor generators whose armatures are mounted upon the same shaft and are rotated by the alternating or polyphase currents; the armatures having windings connected to a commutator adapted to feed mains supplying translating devices by the direct series-multiple or three-wire system.

13. In a system of distribution of electric energy, a generator of alternating currents, lines leading therefrom to a point of distribution and a motor generator taking current from such lines provided with a closed-circuited winding surrounding a portion only of the field magnet pole; whereby a shaded pole is formed, and the starting effect of the transformer motor generator is increased, substantially as described.

14. A motor generator for alternating or polyphase currents, comprising a rotating armature driven by the alternating or polyphase currents and provided with a commutator adapted to deliver commuted currents, and a field magnet having a pole or poles provided with a short-circuited winding surrounding only a portion thereof and adapted to shade the pole and assist the starting effect.

In witness whereof I have hereunto set my hand this 3d day of May, 1893.

EDWIN W. RICE, JR.

Witnesses:
JOHN W. GIBBONEY,
BENJAMIN B. HULL.